(12) United States Patent
Moriyama

(10) Patent No.: US 9,981,715 B2
(45) Date of Patent: May 29, 2018

(54) POWER-ASSISTED BICYCLE

(71) Applicant: YAMAHA HATSUDOKI KABUSHIKI KAISHA, Iwata-shi, Shizuoka (JP)

(72) Inventor: Shuuji Moriyama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days. days.

(21) Appl. No.: 15/281,145

(22) Filed: Sep. 30, 2016

(65) Prior Publication Data
US 2017/0096189 A1 Apr. 6, 2017

(30) Foreign Application Priority Data

Oct. 2, 2015 (JP) .................. 2015-196588

(51) Int. Cl.
*B62M 6/55* (2010.01)
*B62K 11/04* (2006.01)
*B62M 6/90* (2010.01)
*B62M 23/02* (2010.01)
*B62M 6/70* (2010.01)
(Continued)

(52) U.S. Cl.
CPC ............ *B62M 6/55* (2013.01); *B62K 11/04* (2013.01); *B62K 19/30* (2013.01); *B62K 25/286* (2013.01); *B62M 6/70* (2013.01); *B62M 6/90* (2013.01); *B62M 23/02* (2013.01)

(58) Field of Classification Search
CPC .................. B62M 6/40; B62M 6/55
See application file for complete search history.

(56) References Cited

U.S. PATENT DOCUMENTS 6,073,717 A * 6/2000 Yamamoto ............... B62M 6/45
180/206.4
6,591,929 B1 * 7/2003 Tsuboi ..................... B62M 6/70
180/206.4
(Continued)

FOREIGN PATENT DOCUMENTS

DE 10 2013 112 804 A1 5/2014
EP 0 905 013 A2 3/1999
(Continued)

OTHER PUBLICATIONS

Machine translation of DE 10 2013 112804 (Year: 2014).*

*Primary Examiner* — Kevin Hurley
(74) *Attorney, Agent, or Firm* — Keating and Bennett, LLP

(57) ABSTRACT

A power-assisted bicycle includes a front wheel, a rear wheel, a body frame, a bracket that mounts a power unit, and a power unit fixed to the bracket by a bolt. The power unit includes a pedal crank shaft and a motor that produces auxiliary power, and outputs each of human power applied to the pedal crank shaft and a driving force of the motor, or a resultant force of the human power and the driving force of the motor. The bracket includes a front mounting seat and rear mounting seat pointing downward. The power unit includes first and second front mounts and first and second rear mounts which overlap the front mounting seat and rear mounting seat from below. The bolt extends in a direction in which the front mounting seat and rear mounting seat and the mounts overlap each other, and fastens the mounts to the front mounting seat and the rear mounting seat.

5 Claims, 16 Drawing Sheets

(51) Int. Cl.
    *B62K 19/30*     (2006.01)
    *B62K 25/28*     (2006.01)

(56) References Cited

U.S. PATENT DOCUMENTS

| | | |
|---|---|---|
| 8,678,417 B1 | 3/2014 | Chang |
| 2007/0007063 A1 | 1/2007 | Okamoto et al. |
| 2016/0339992 A1* | 11/2016 | Yoshiie .................... B62M 6/45 |
| 2017/0016526 A1* | 1/2017 | Watarai ................ F16H 57/025 |
| 2017/0057582 A1* | 3/2017 | Nishikawa ............... B62M 6/55 |

FOREIGN PATENT DOCUMENTS

| | | | | |
|---|---|---|---|---|
| JP | 08207874 A | * | 8/1996 | .......... B60L 11/1801 |
| JP | 2000-177676 A | | 6/2000 | |
| JP | 2001-106163 A | | 4/2001 | |
| KR | 10-2013-0110294 A | | 10/2013 | |
| TW | 564869 U | | 12/2003 | |
| TW | I265896 B | | 11/2006 | |
| TW | I302511 B | | 11/2008 | |

\* cited by examiner

RIGHT ←→ LEFT

POWER-ASSISTED BICYCLE

CROSS REFERENCE TO RELATED APPLICATIONS

This application claims the benefit of priority to Japanese Patent Application 2015-196588 filed Oct. 2, 2015, the entire contents of which are hereby incorporated by reference.

BACKGROUND OF THE INVENTION

1. Field of the Invention

The present invention relates to a power-assisted bicycle including a power unit mounted on a body frame.

2. Description of the Related Art

A conventional power-assisted bicycle is disclosed in, e.g., Japanese Patent Laid-Open No. 2001-106163 (simply referred to as JP 2001-106163 hereinafter). This power-assisted bicycle includes a body frame that supports a front wheel and rear wheel, and a power unit mounted on the body frame. The power unit includes, for example, a pedal crank shaft which is rotated by the pedal force of a biker, a motor, and an output shaft. The resultant force of the pedal force (human power) of a biker and a motor driving force proportional to the magnitude of the pedal force is applied to the output shaft. The rotation of the output shaft is transmitted to the rear wheel via a chain.

The body frame includes, e.g., a head pipe which steerably supports a front fork, a down tube which extends rearward and downward from the head pipe, and a seat tube which extends upward from the lower end of the down tube. The power unit is mounted on a connector between the down tube and the seat tube via a plurality of power unit mounting brackets. A battery is installed above the power unit. The battery supplies power to the motor of the power unit. The battery has a shape which is elongated in an upper-lower direction and arranged between the seat tube and rear wheel.

The power unit mounting brackets are arranged in positions corresponding to the two ends of the power unit in the front-rear direction of the body frame, and in a position corresponding to the upper end of the power unit. Also, the pair of brackets each include plate-shaped portions extending in the left-right direction of the body frame. Each plate-shaped portion extends in the front-rear direction and in the upper-lower direction of the body frame, and includes a through hole to insert a fixing bolt. In addition, the plate-shaped portions are spaced apart from each other at an interval into which a mount of the power unit is inserted. The mount of the power unit includes a through hole to insert the fixing bolt, and is fastened to the plate-shaped portions by the fixing bolt while being inserted between the pair of plate-shaped portions. Therefore, the pair of plate-shaped portions elastically deform as they are pressed by the head of the fixing bolt and a nut, and are in tight contact with the mount as they are pushed from the two sides in the left-right direction.

In bicycles, including a power-assisted bicycle, the pedal force of a biker is desirably fully transmitted to the rear wheel.

To fully transmit the pedal force to the rear wheel in the power-assisted bicycle, the power unit must be mounted on the body frame in a rigid state in which the power unit cannot be displaced. To eliminate the displacement of the power unit, the rigidity of the power unit mounting brackets must be increased.

Unfortunately, the mounting structure of the power unit disclosed in JP 2001-106163 has the problem that the rigidity of the bracket that supports the power unit cannot further be increased. This is because, if the rigidity of the bracket increases, the plate-shaped portion hardly elastically deforms, so the pair of plate-shaped portions cannot clamp the mount of the power unit. When the plate-shaped portions and mount are made with high accuracy and the gap between them is minimized, the plate-shaped portions clamp the mount even if the elastic deformation amount of each plate-shaped portion is very small. However, this arrangement, which increases the accuracy more than necessary, cannot be used because the manufacturing cost unnecessarily increases.

SUMMARY OF THE INVENTION

Preferred embodiments of the present invention provide a power-assisted bicycle that improves fastening properties when mounting a power unit and increases the rigidity of the mounting structure, while reducing the manufacturing cost.

A power-assisted bicycle according to a preferred embodiment of present invention includes a front wheel, a rear wheel, a body frame that steerably and rotatably supports the front wheel, and rotatably supports the rear wheel, a power unit mounting bracket on the body frame, a power unit fixed to the bracket by a fixing bolt and including a crank shaft to be rotated by human power and a motor that produces auxiliary power, and that outputs each of the human power applied to the crank shaft and a motor driving force, or a resultant force of the human power and the motor driving force, and a transmission that transmits the resultant force of the human power and the motor driving force to the rear wheel, wherein the bracket includes a mounting seat pointing downward when viewed in a state in which the front wheel and the rear wheel are on the ground, the power unit includes a mount that overlaps the mounting seat from below, and the fixing bolt extends in a direction in which the mounting seat and the mount overlap each other, and fastens the mount to the mounting seat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of a power-assisted bicycle will be explained in detail below with reference to FIGS. 1 to 5.

Figure 1:
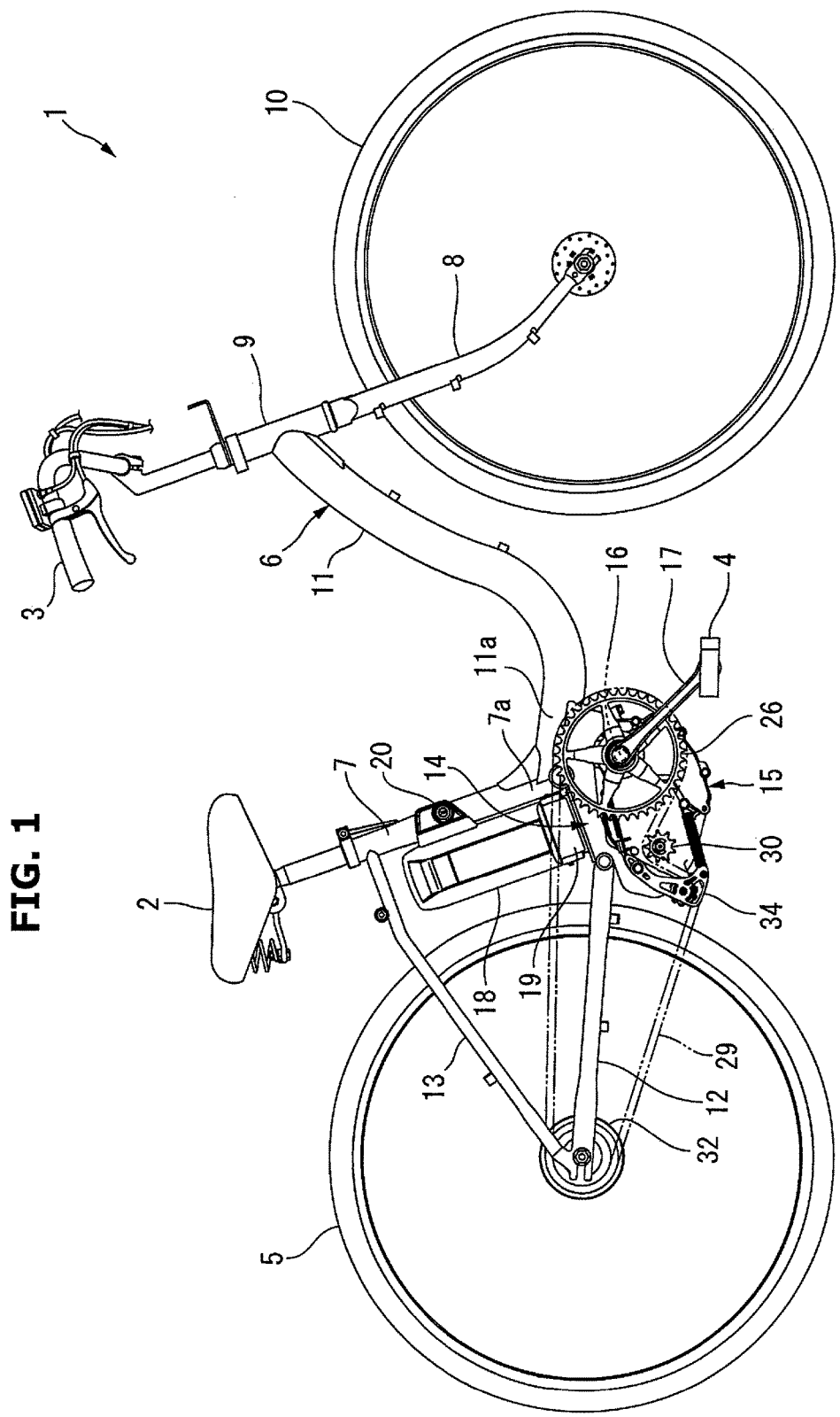
FIG. 1 is a side view of a power-assisted bicycle according to a first preferred embodiment of the present invention.

A power-assisted bicycle 1 shown in FIG. 1 includes a saddle 2 on which a biker (not shown) sits, and a handle 3 which the biker holds. When the biker steps on pedals 4 positioned below the saddle 2, a rear wheel 5 is driven, and the bicycle runs. The saddle 2 is installed on the upper end of a seat tube 7 of a body frame 6. The handle 3 is pivotally supported together with a front fork 8 by a head pipe 9 of the body frame 6 such that the handle 3 pivots together with the front fork 8. The front fork 8 rotatably supports a front wheel 10.

The body frame 6 includes, e.g., the head pipe 9, a down tube 11 extending rearward and downward from the head pipe 9, the seat tube 7 extending upward from a vicinity of the lower end of the down tube 11, and chain stays 12 and seat stays 13 which rotatably support the rear wheel 5. In the present preferred embodiment, a power unit mounting bracket 14 (to be described below) is, for example, welded to a lower end 11a of the down tube 11 and a lower end 7a of the seat tube 7. A power unit 15 is mounted via the bracket 14. A pedal crank shaft 16 (see FIG. 2) of the power unit 15 supports the pedals 4 described above via pedal cranks 17.

The chain stays 12 and seat stays 13 extend in the front-rear direction of the body frame on the two sides of the rear wheel 5. Front ends 12a of the chain stays 12 are, for example, welded to the power unit mounting bracket 14 (to be described later). The front ends of the seat stays 13 are welded to the upper end of the seat tube 7. A battery 18 that supplies power to the power unit 15 and other electrical components is arranged in a space below the front ends of the seat stays 13 and between the rear wheel 5 and the seat tube 7.

The battery 18 preferably has a rectangular or substantially rectangular shape which is elongated in an upper-lower direction. The lower end of the battery 18 is detachably supported by a support 19. The support 19 is attached to the power unit mounting bracket 14. The battery 18 supported by the support 19 is able to swing between a mounted position shown in FIG. 1 and a detaching position at which the upper portion of the battery 18 falls to the left side of the body frame. In a state in which the battery 18 is positioned in the mounted position, a connector (not shown) is connected to the battery 18, so the battery 18 is able to supply power. In a state in which the battery 18 is positioned in the detaching position, the connector is disconnected, so the battery 18 is able to be detached. Also, in the state in which the battery 18 is positioned in the above-described mounted position, a lock 20 attached to the seat tube 7 regulates the swinging of the battery 18, thus holding the battery 18.

Figure 2:
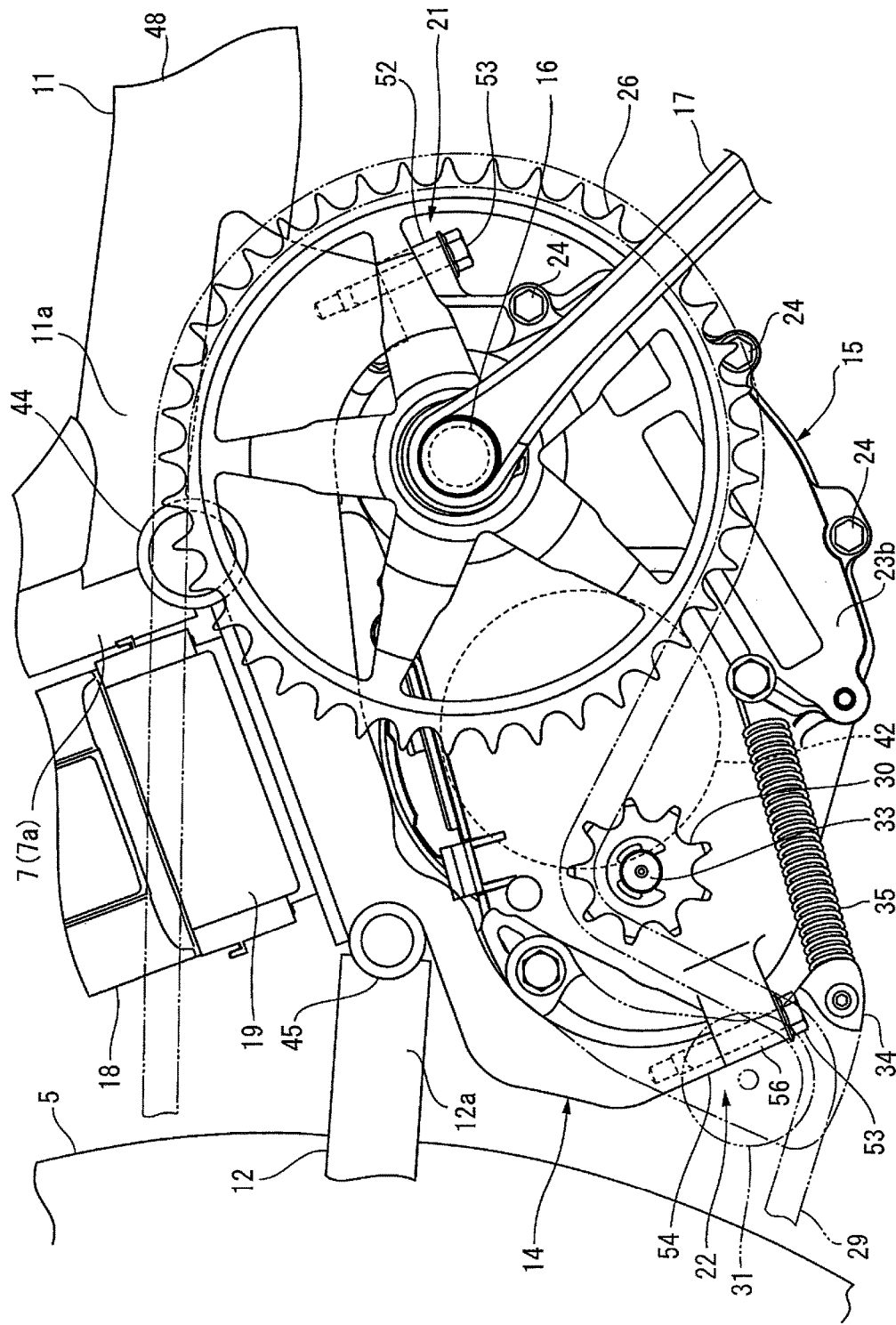
FIG. 2 is a side view showing a main portion of the power-assisted bicycle in an enlarged scale.

As will be described in detail below, the power unit mounting bracket 14 and the power unit 15 are connected to each other, as shown in FIG. 2, by a front fastener 21 positioned at the ends of these members on the front side of the body frame, and a rear fastener 22 positioned at the ends on the rear side of the body frame.

The power unit 15 is assembled by attaching all of these components and devices to a metal housing 23, and is arranged below and near the bracket 14.

Figure 3:
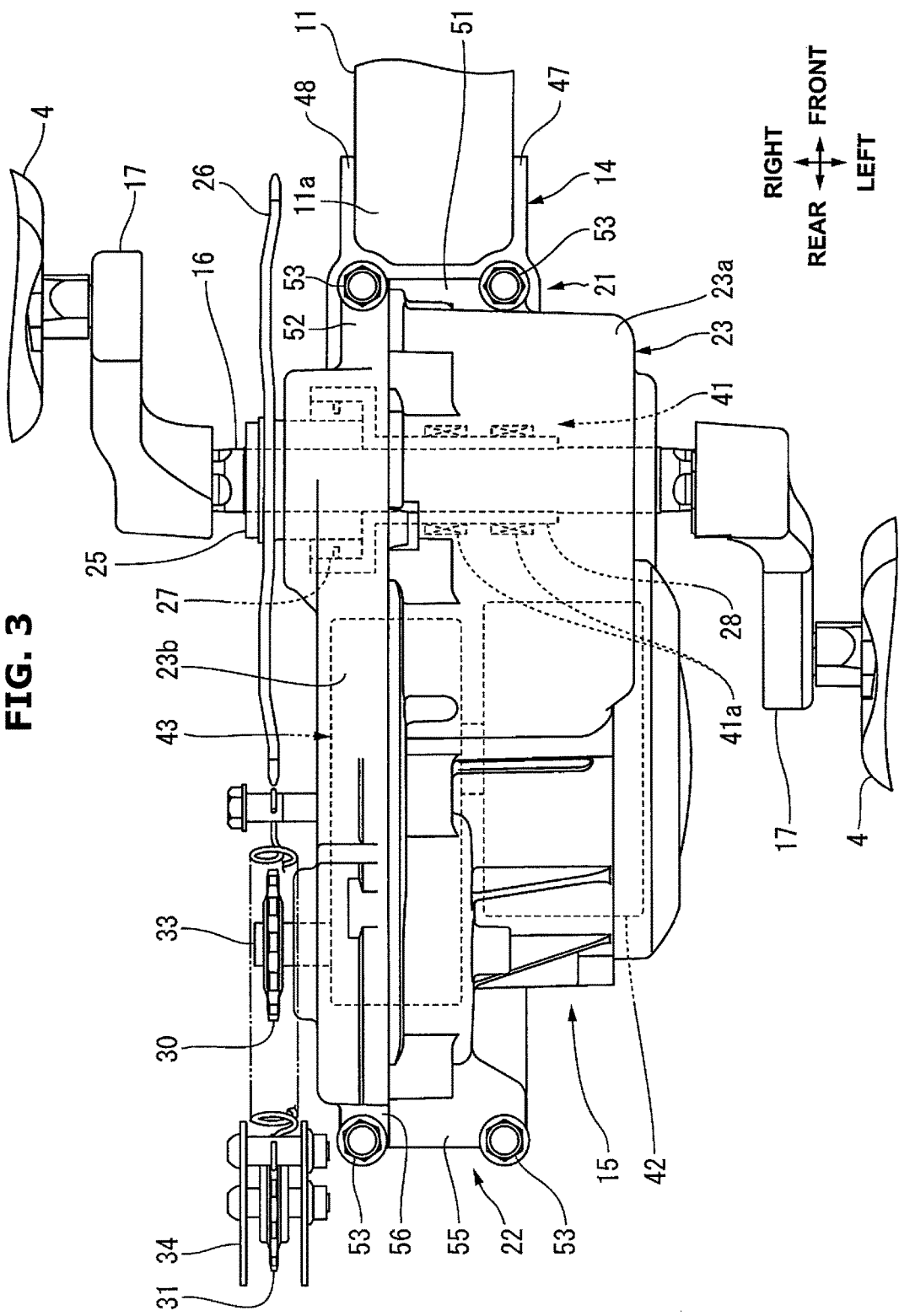
FIG. 3 is a bottom view of a power unit and a bracket.

As shown in a bottom view of FIG. 3, the housing 23 is able to be split in the left-right direction into a left half 23a positioned on the body frame left side (the lower side in FIG. 3), and a right half 23b positioned on the body frame right side (the upper side in FIG. 3). The left half 23a and the right half 23b are joined together and connected by, for example, a plurality of connecting bolts 24 (see FIG. 2).

The pedal crank shaft 16 extends in the left-right direction of the body frame through the end of the housing 23 on the body frame front side.

The pedal crank shaft 16 is rotatably supported by the housing 23. One end of each pedal crank 17 is fixed to a corresponding one of the two ends of the pedal crank shaft 16. The pedal 4 is rotatably attached to the other end of each pedal crank 17. Referring to FIG. 3, a crank rotation output shaft 25 is exposed between the pedal crank 17 positioned on the body frame right side and the housing 23. The crank rotation output shaft 25 is arranged on the same axis as that of the pedal crank shaft 16, and is rotatably supported by the housing 23. A chain sprocket 26 is attached to the crank rotation output shaft 25. The crank rotation output shaft 25 is connected to a crank rotation input shaft 28 (to be described below) via a human-powered one-way clutch 27. The one-way clutch 27 prevents the reverse rotation of the chain sprocket 26 when the pedal crank shaft 16 reversely rotates. Also, the one-way clutch 27 allows the chain sprocket 26 to rotate in the rotational direction when the bicycle runs in a state in which the pedal crank shaft 16 stops.

The chain sprocket 26 transmits the human power to the rear wheel 5. As shown in FIG. 1, a chain 29 (see FIG. 1) that drives the rear wheel is wound around the chain sprocket 26. As shown in FIGS. 1 and 2, the chain 29 is wound around the chain sprocket 26 and a sprocket 32 of the rear wheel 5 in a state in which the chain 29 is wound around an output sprocket 30 and a tension sprocket 31 of the power unit 15. The output sprocket 30 is fixed to a motor output shaft 33 (to be described below) of the power unit 15. The tension sprocket 31 is rotatably supported by a tension arm 34 which is able to swing in the power unit 15. The spring force of a tension coil spring 35 biases the tension arm 34 in a direction in which the chain 29 is pulled.

As indicated by the broken lines in FIG. 3, the power unit 15 includes, for example, a pedal force detector 41 arranged coaxially around the pedal crank shaft 16, a motor 42 that produces auxiliary power positioned closer to the body frame rear side than the pedal crank shaft 16, and a speed reducer 43 that reduces the speed of the rotation of the motor 42 and transmits the rotation to the motor output shaft 33. The pedal force detector 41 detects the magnitude of human power. As the pedal force detector 41, it is possible to use, e.g., a well-known magnetostrictive detector. The magnetostrictive pedal force detector 41 includes, for example, the cylindrical crank rotation input shaft 28 arranged coaxially around the pedal crank shaft 16, and a detection coil 41a arranged around the crank rotation input shaft 28. In this case, one end of the crank rotation input shaft 28 is connected to the pedal crank shaft 16, and the other end thereof is connected to an input of the one-way clutch 27. That is, when the pedal force of the biker is applied to the pedal crank shaft 16, the crank rotation input shaft 28 strains due to this pedal force. The detection coil 41a detects a change in magnetic permeability due to a strain in the crank rotation input shaft 28.

The motor 42 applies, to the speed reducer 43, a motor driving force proportional to the magnitude of the human power detected by the pedal force detector 41. The battery 18 positioned above the power unit 15 supplies electric power to the motor 42.

The speed reducer 43 reduces the speed of the rotation of the motor 42 and transmits the rotation to the motor output shaft 33. The motor output shaft 33 is connected to the speed reducer 43 via a motor one-way clutch (not shown). The motor one-way clutch allows the motor output shaft 33 to rotate together with the output sprocket 30 and chain 29 while the motor 42 is stopped.

In the power unit 15, the motor output shaft 33 rotates when the motor 42 rotates, and the output sprocket 30 on the motor output shaft 33 applies the motor driving force to the chain 29. That is, the power unit 15 outputs the human power applied to the pedal crank shaft 16 and the motor driving force to the outside. The human power and the motor driving force are applied to the chain 29, and transmitted as the resultant force of the human power and motor driving force to the rear wheel 5 via the chain 29. In the present preferred embodiment, the chain 29 is an example of "a transmission."

Figure 4:
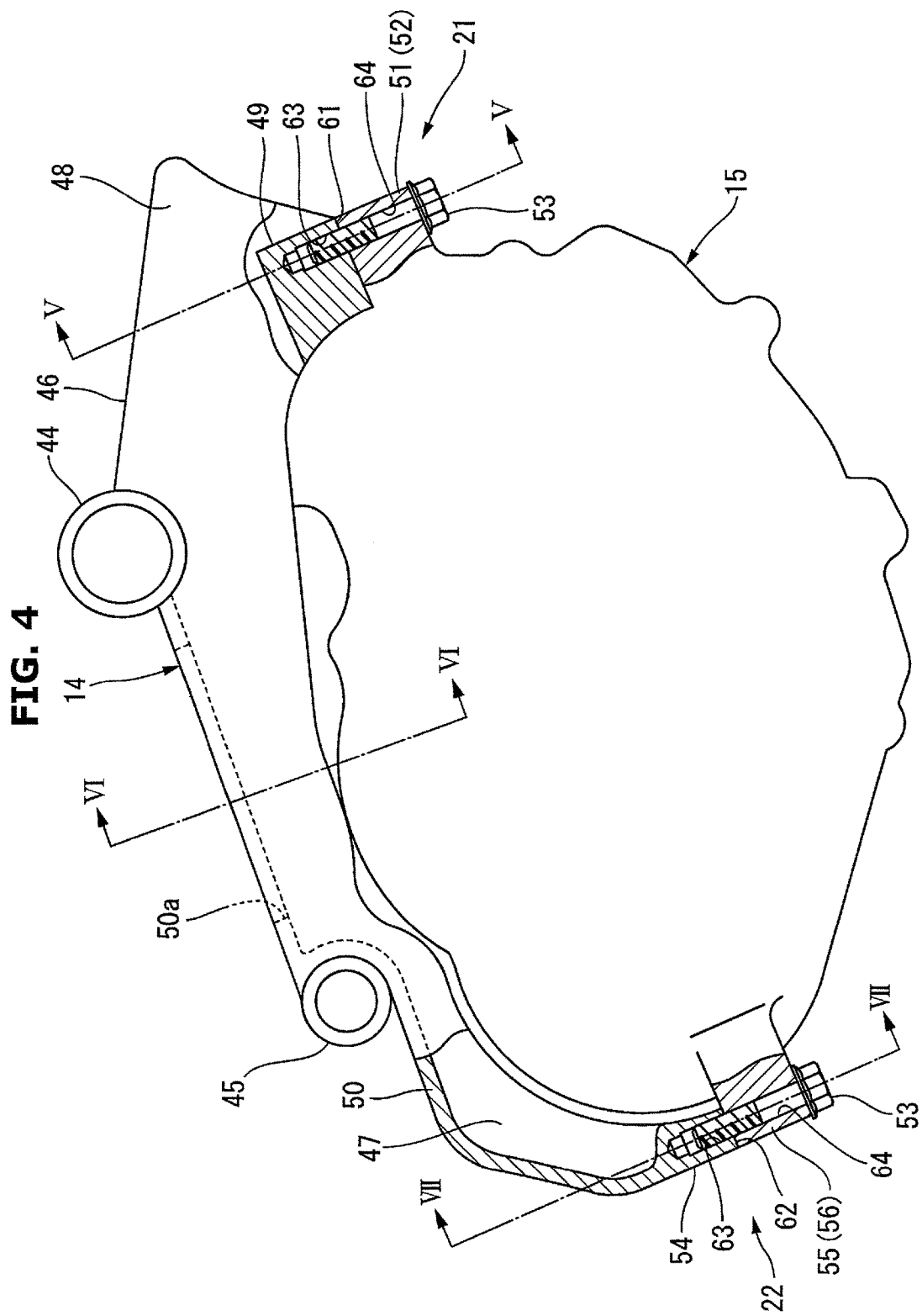
FIG. 4 is a side view of the bracket, and shows a state in which a front fastener and rear fastener are cut away.

As shown in FIG. 4, the bracket 14 that mounts the power unit 15 on the body frame 6 preferably has an arcuate shape which projects upward when viewed from the side. FIG. 4 shows a state in which the power-assisted bicycle 1 with the front wheel 10 and rear wheel 5 on the ground is viewed from the right side of the body frame.

The bracket 14 according to the present preferred embodiment includes a first pipe 44, a second pipe 45, and a molded portion 46. The first and second pipes 44 and 45 are made of, for example, an aluminum alloy, and are, for example, welded to the upper end of the molded portion 46 so as to extend in the left-right direction of the body frame.

The molded portion 46 is made to have a predetermined shape by, for example, forging or casting using, for example, an aluminum alloy. As shown in FIGS. 5 to 8, the molded portion 46 includes a pair of side plates 47 and 48 positioned at the end of the body frame right side and the end of the body frame left side, a pillar member 49 extending between the front ends of the side plates 47 and 48, and a top plate 50 connecting the upper ends of the pair of side plates 47 and 48.

Of the first and second pipes 44 and 45, the first pipe 44 positioned on the body frame front side connects the upper ends of the pair of side plates 47 and 48 on the body frame front side.

The top plate 50 is located closer to the body frame rear side than the first pipe 44. As shown in FIG. 2, the lower end 11a of the down tube 11 and the lower end 7a of the seat tube 7 are, for example, welded to the first pipe 44. The lower end 11a of the down tube 11 is also, for example, welded to the upper ends of the side plates 47 and 48 positioned closer to the body frame front side than the first pipe 44. Of the first and second pipes 44 and 45, the second pipe 45 positioned on the body frame rear side connects the upper ends of the pair of side plates 47 and 48 on the body frame rear side. As shown in FIG. 2, the front ends 12a of the chain stays 12 are, for example, welded to the second pipe 45. In the present preferred embodiment, therefore, the bracket 14 is fixed to the body frame 6 by being welded to the lower end 11a of the down tube 11, the lower end 7a of the seat tube 7, and the front ends 12a of the chain stays 12.

Figure 6:
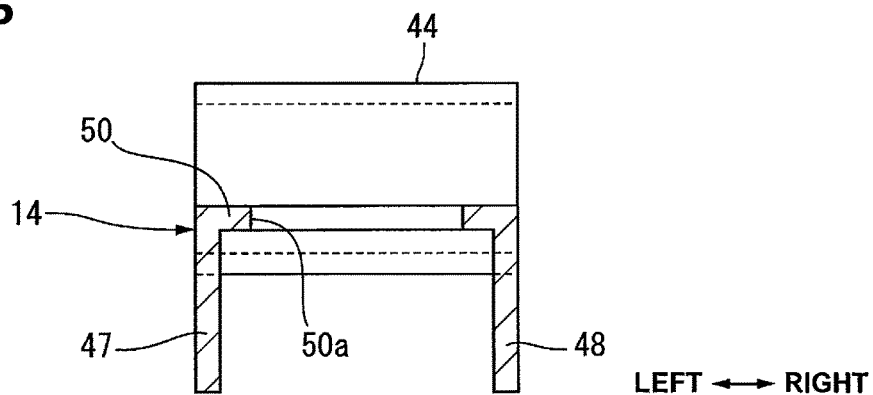
FIG. 6 is a sectional view taken along a line VI-VI of the bracket shown in FIG. 4.

As shown in FIG. 6, a through hole 50a is provided in a portion of the top plate 50 of the molded portion 46, which is positioned between the first pipe 44 and second pipe 45. Although not shown, a cable, a brake wire, and the like that connect the battery 18 and the power unit 15 are inserted into the through hole 50a. The support 19 for the battery 18 is attached to the portion of the top plate 50, which is positioned between the first pipe 44 and the second pipe 45.

Figure 5:
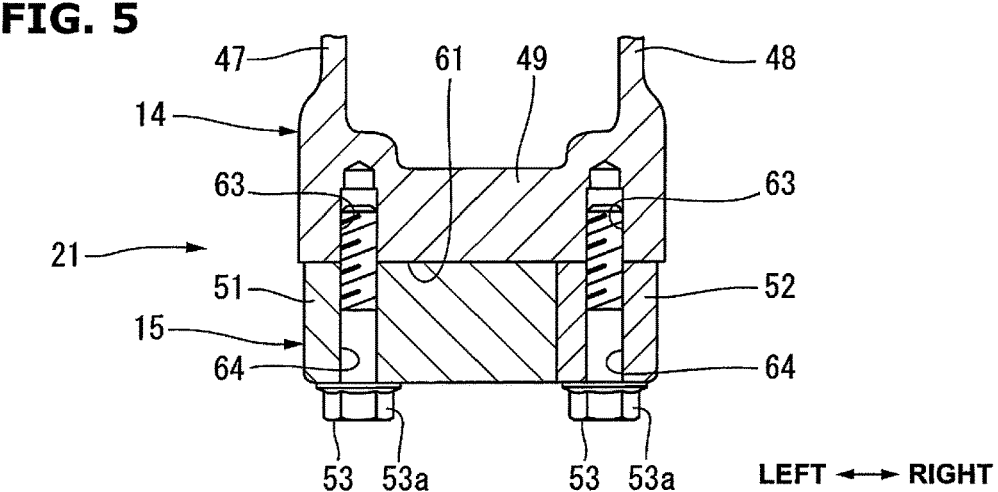
FIG. 5 is a sectional view taken along a line V-V of the front fastener shown in FIG. 4.
Figure 7:
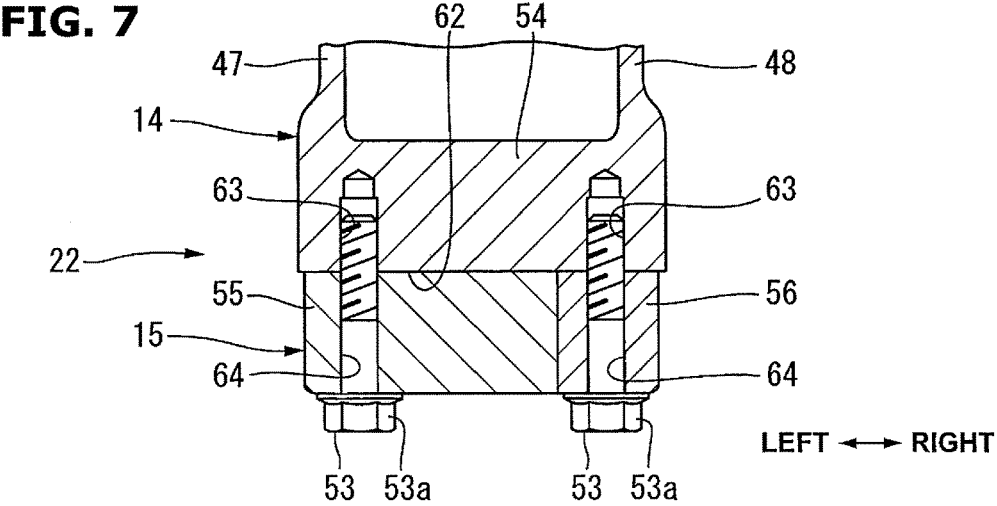
FIG. 7 is a sectional view taken along a line VII-VII of the rear fastener shown in FIG. 4.
Figure 8:
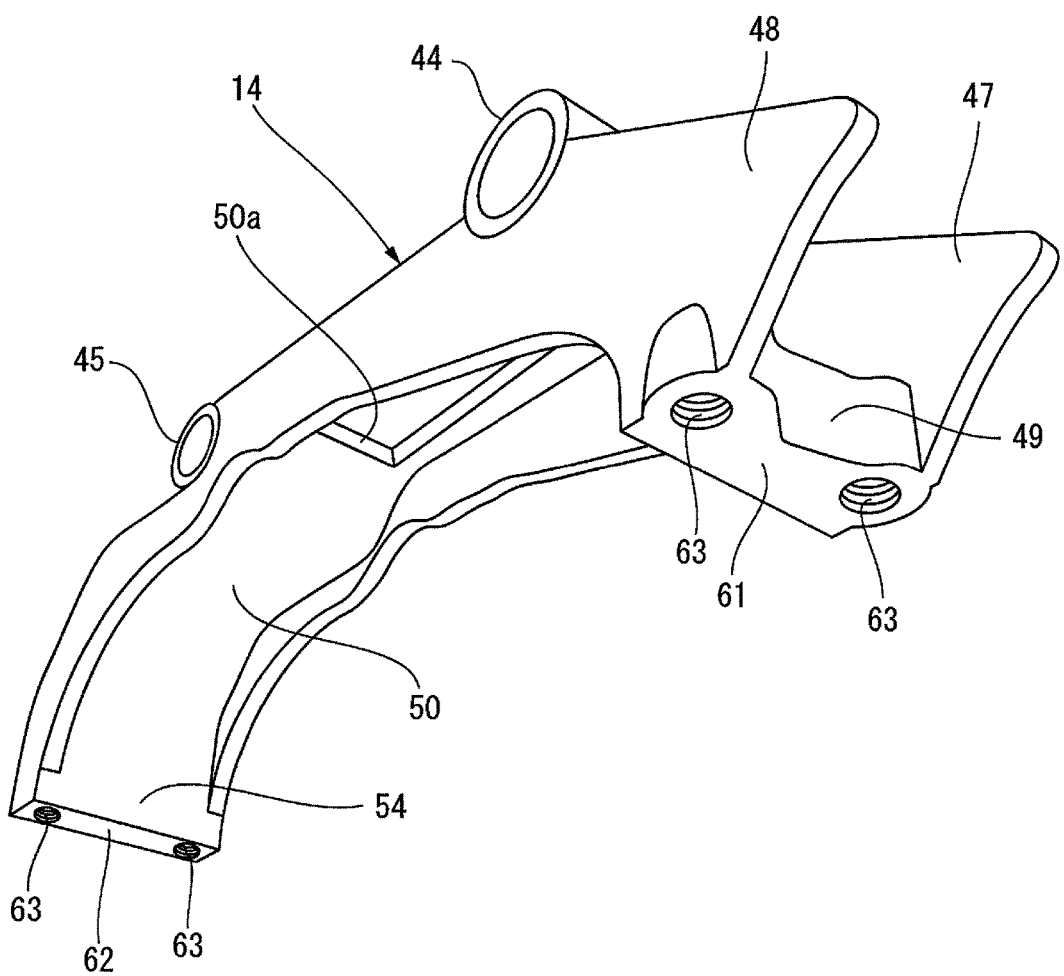
FIG. 8 is a perspective view showing the bracket when it is viewed obliquely from the front and from below.

As shown in FIG. 5, the pillar member 49 of the molded portion 46 defines the front fastener 21 together with first and second front mounts 51 and 52 (see FIG. 4) and two fixing bolts 53 of the power unit 15. Also, as shown in FIG. 7, a bracket rear end 54, having a plate-shape defined by the rear ends of the pair of side plates 47 and 48 and the rear end of the top plate 50, defines the rear fastener 22 together with first and second rear mounts 55 and 56 and two fixing bolts 53 of the power unit 15.

The pillar member 49 includes a front mounting seat 61 pointing downward. The bracket rear end 54 includes a rear mounting seat 62 pointing downward. "Downward," as used herein, means downward when viewed in a state in which the front wheel 10 and rear wheel 5 of the power-assisted bicycle 1 are grounded, and includes downward along the vertical direction, and obliquely downward inclining to at least one of the front-rear direction and left-right direction of the body frame with respect to the vertical direction.

Screw holes 63 into which the fixing bolts 53 are screwed are provided in each of the front mounting seat 61 and the rear mounting seat 62. In the present preferred embodiment, the screw hole 63 is an example of "a female screw."

As shown in FIG. 3, the first front mount 51 of the power unit 15 is preferably integral with the front end of the left half 23a of the housing 23. The second front mount 52 is preferably integral with the front end of the right half 23b of the housing 23. Also, the first rear mount 55 is preferably integral with the rear end of the left half 23a of the housing 23. The second rear mount 56 is preferably integral with the rear end of the right half 23b of the housing 23. A through hole 64 (see FIGS. 5 and 7) which extends in an upper-lower direction in a state in which the front wheel 10 and rear wheel 5 of the power-assisted bicycle are grounded is provided in each of the first and second front mounts 51 and 52 and the first and second rear mounts 55 and 56.

As shown in FIG. 5, the first and second front mounts 51 and 52 are overlaid on the front mounting seat 61 of the pillar member 49 from below, and fastened by the fixing bolts 53. The fixing bolts 53 extend in the upper-lower direction such that heads 53a are positioned below. The fixing bolts 53 are inserted into the through holes 64 of the first and second front mounts 51 and 52, and screwed into the screw holes 63 of the pillar member 49. "The upper-lower direction" includes a direction that is vertical, i.e., a direction that is perpendicular to a horizontal plane, and directions that are inclined with respect to a horizontal plane. The first and second front mounting portions 51 and 52 and the front mounting seat 61 of the pillar member 49 overlap each other in the upper-lower direction.

As shown in FIG. 7, the first and second rear mounts 55 and 56 are overlaid on the rear mounting seat 62 of the bracket rear end 54 from below, and fastened by the fixing bolts 53. The fixing bolts 53 extend in the upper-lower direction such that the heads 53a are positioned below. The fixing bolts 53 are inserted into the through holes 64 of the first and second rear mounts 55 and 56, and screwed into the screw holes 63 of the bracket rear end 54. The first and second rear mounts 55 and 56 and the rear mounting seat 62 of the bracket rear end 54 overlap each other in an upper-lower direction.

Next, the procedure of mounting the power unit 15 described above on the body frame 6 will be explained. The work of mounting the power unit 15 is performed in a state in which the body frame 6 is inverted, i.e., turned upside down. When the body frame 6 is inverted, the front mounting seat 61 and rear mounting seat 62 of the bracket 14 point upward. To mount the power unit 15 on the body frame 6, the first and second front mounts 51 and 52 are first overlaid on the front mounting seat 61 projecting upward, and the first and second mounts 55 and 56 are overlaid on the rear mounting seat 62 from above.

Then, the fixing bolts 53 are inserted from above into the through holes 64 of the mounts 51, 52, 55, and 56, and screwed into the screw holes 63 of the front mounting seat 61 and the rear mounting seat 62. When the fixing bolts 53 are screwed into the screw holes 63, the first and second front mounts 51 and 52 are fastened to the front mounting seat 61, and the first and second rear mounts 55 and 56 are fastened to the rear mounting seat 62. Consequently, the power unit 15 is mounted on the body frame 6 via the bracket 14.

In the present preferred embodiment, the bracket 14 need not elastically deform when attaching the first and second front mounts 51 and 52 and the first and second rear mounts 55 and 56 of the power unit 15 to the front mounting seat 61 and the rear mounting seat 62 of the bracket 14. This means that the bracket 14 having a high rigidity is able to be used. The bracket 14 and the mounts 51, 52, 55, and 56 of the power unit 15 need only have an accuracy by which they are able to overlap each other in an upper-lower direction. This accuracy is lower than that when inserting the mount between the pair of mounting plates so as to narrow the gap as in a conventional bicycle.

Accordingly, the accuracy does not need to be higher than necessary when making the power unit mounting bracket 14 and the first and second front mounts 51 and 52 and the first and second rear mounts 55 and 56 of the power unit 15. The power unit 15 is securely mounted on the body frame 6 by the power unit mounting bracket 14 having a high rigidity. The present preferred embodiment is able to provide a power-assisted bicycle that improves both the fastening properties and the rigidity when mounting the power unit 15 while also reducing the manufacturing cost.

The screw holes 63 (female screws) into which the fixing bolts 53 are screwed are provided in the front mounting seat 61 and the rear mounting seat 62 of the bracket 14. The through holes 64 which extend in an upper-lower direction when viewed in a state in which the front wheel 10 and rear wheel 5 are grounded are provided in the first and second front mounts 51 and 52 and the first and second rear mounts 55 and 56 of the power unit 15. The fixing bolts 53 are screwed into the screw holes 63 through the through holes 64.

In the present preferred embodiment, the heads 53a of the fixing bolts 53 are positioned below the mounts 51, 52, 55, and 56. When compared to a case in which the fixing bolts 53 are inverted in an upper-lower direction, therefore, parts to be exposed below the mounts 51, 52, 55, and 56 are minimized. This is because, if the distal ends of the fixing bolts 53 are positioned below the mounts 51, 52, 55, and 56, the distal ends of the fixing bolts 53 and nuts (not shown) fastened to the distal ends are exposed. Accordingly, the outer appearance of the power unit 15 is not spoiled by the fixing bolts 53.

Also, in the present preferred embodiment, the screw holes 63 are provided in the front mounting seat 61 and the rear mounting seat 62 of the bracket 14. Therefore, the fastening work is performed with the fixing bolts 53 pointing downward by turning the body frame 6 upside down. That is, the fixing bolts 53 are inserted from above into the through holes 64 of the power unit 15 and screwed into the screw holes 63.

Accordingly, the work of mounting the power unit 15 is easily performed in the present preferred embodiment.

The body frame 6 according to the present preferred embodiment includes the front fork 8, the down tube 11, the seat tube 7, and the chain stays 12. The bracket 14 is fixed to the body frame 6 by, for example, being welded to the lower end 11a of the down tube 11, the lower end 7a of the seat tube 7, and the front ends 12a of the chain stays 12.

The fasteners (the front fastener 21 and the rear fastener 22) including the front mounting seat 61 and the rear mounting seat 62 of the bracket 14, the mounts 51, 52, 55, and 56 of the power unit 15, and the fixing bolts 53 are provided in the two ends of the bracket 14 and power unit 15 in the front-rear direction of the body frame.

Since no fastener is provided in a central portion above the power unit 15 in the front-rear direction, the bracket 14 is close to the portion above the power unit 15, so a wide free space is provided above the bracket 14. In the present preferred embodiment, the support 19 of the battery 18 is arranged in this free space. Accordingly, the battery 18, which is a heavy component, is arranged near the center of the lower portion of the body frame. This makes it possible to centralize the mass and lower the center of gravity, and further increases the running stability.

Furthermore, the bracket 14 according to the present preferred embodiment extends to the front portions of the chain stays 12 from the lower end 11a of the down tube 11 via the lower portion of the seat tube 7, and preferably has an arcuate shape extending in the front-rear direction of the body frame. Since the power unit 15 is mounted on the front end and the rear end of the bracket 14, the power unit 15 reinforces the bracket 14 which extends in the front-rear direction. In the present preferred embodiment, therefore, it is unnecessary to provide a reinforcing member in the lower portion of the bracket 14 which projects upward when viewed from the side, so the bracket 14 is light in weight and compact.

Second Preferred Embodiment

A power-assisted bicycle according to a second preferred embodiment of present invention is shown in FIGS. 9 to 12.

The same reference numerals as in FIGS. 1 to 8 denote the same or similar members in FIGS. 9 to 12, and a detailed explanation thereof will be omitted.

Figure 9:
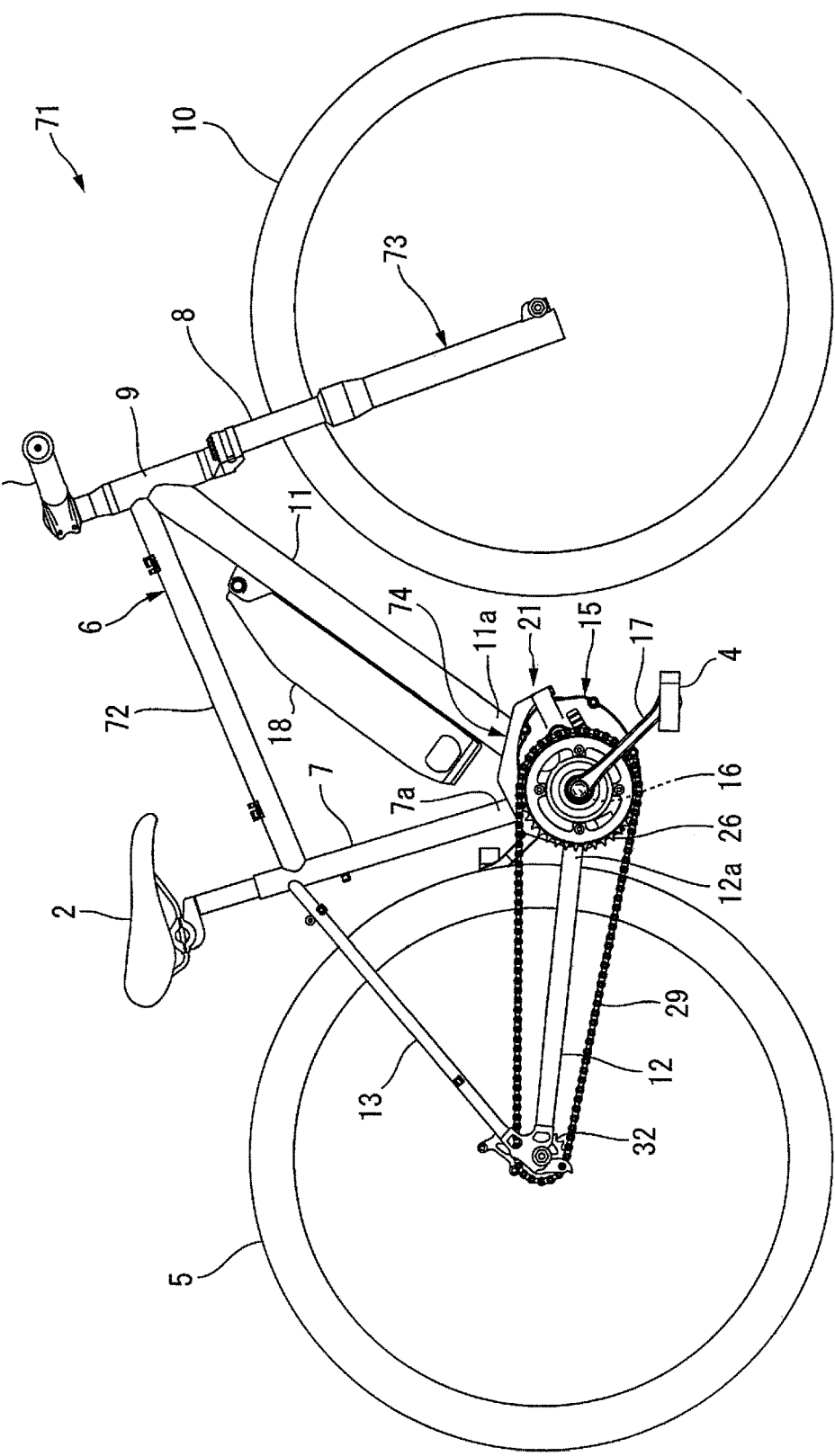
FIG. 9 is a side view of a power-assisted bicycle according to a second preferred embodiment of the present invention.

A power-assisted bicycle 71 shown in FIG. 9 differs from the power-assisted bicycle 1 shown in FIG. 1 in the structure of a body frame 6 and the structure of a power unit 15. The body frame 6 of the power-assisted bicycle 71 according to the present preferred embodiment includes a top tube 72 connecting a head pipe 9 and the upper end of a seat tube 7. A front fork 8 preferably includes so-called telescopic front suspensions 73. Also, a down tube 11 extends linearly rearward and downward. A battery 18 is detachably mounted on the down tube 11. A lower end 11a of the down tube 11 and a lower end 7a of the seat tube 7 are individually welded, for example, to a power unit mounting bracket 74.

Figure 10:
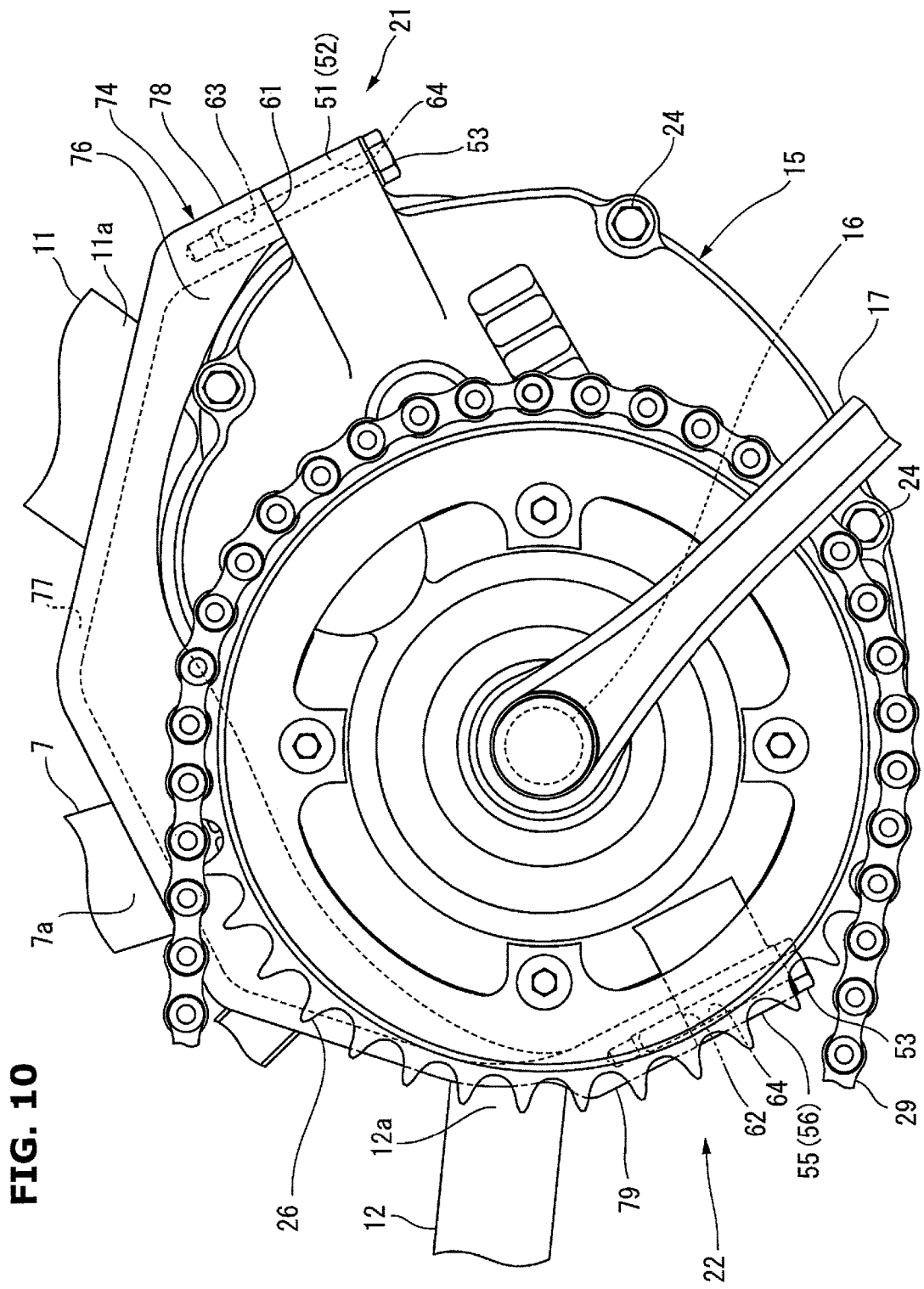
FIG. 10 is a side view showing a main portion of the power-assisted bicycle in an enlarged scale.

The bracket 74 according to the present preferred embodiment has a predetermined shape formed by, for example, forging or casting using, for example, an aluminum alloy. The bracket 74 includes a pair of left and right side plates 75 and 76, and a top plate 77 connecting the upper ends of the side plates 75 and 76. As shown in FIG. 10, the bracket 74 preferably has an arcuate shape which projects upward when viewed from the side. As shown in FIG. 10, the lower end 11a of the down tube 11 is, for example, welded as it obliquely downwardly abuts against the front portion of the top plate 77 from the front. The lower end 7a of the seat tube 7 is, for example, welded as it obliquely downwardly abuts against the middle portion of the top plate 77 from behind. Front ends 12a of chain stays 12 are, for example, welded as they abut against the rear portion of the top plate 77 from behind.

A bracket front end 78 including the front ends of the pair of left and right side plates 75 and 76 and the front end of the top plate 77 includes a front mounting seat 61 pointing downward. Also, a bracket rear end 79 including the rear ends of the pair of left and right side plates 75 and 76 and the rear end of the top plate 77 includes a rear mounting seat 62 pointing downward. As in the first preferred embodiment, "downward," as used herein, means downward when viewed in a state in which a front wheel 10 and a rear wheel 5 of the power-assisted bicycle 71 are grounded. Also, "downward" includes downward along the vertical direction, and obliquely downward inclining to at least one of the front-rear direction and the left-right direction of the body frame with respect to the vertical direction.

Figure 12:
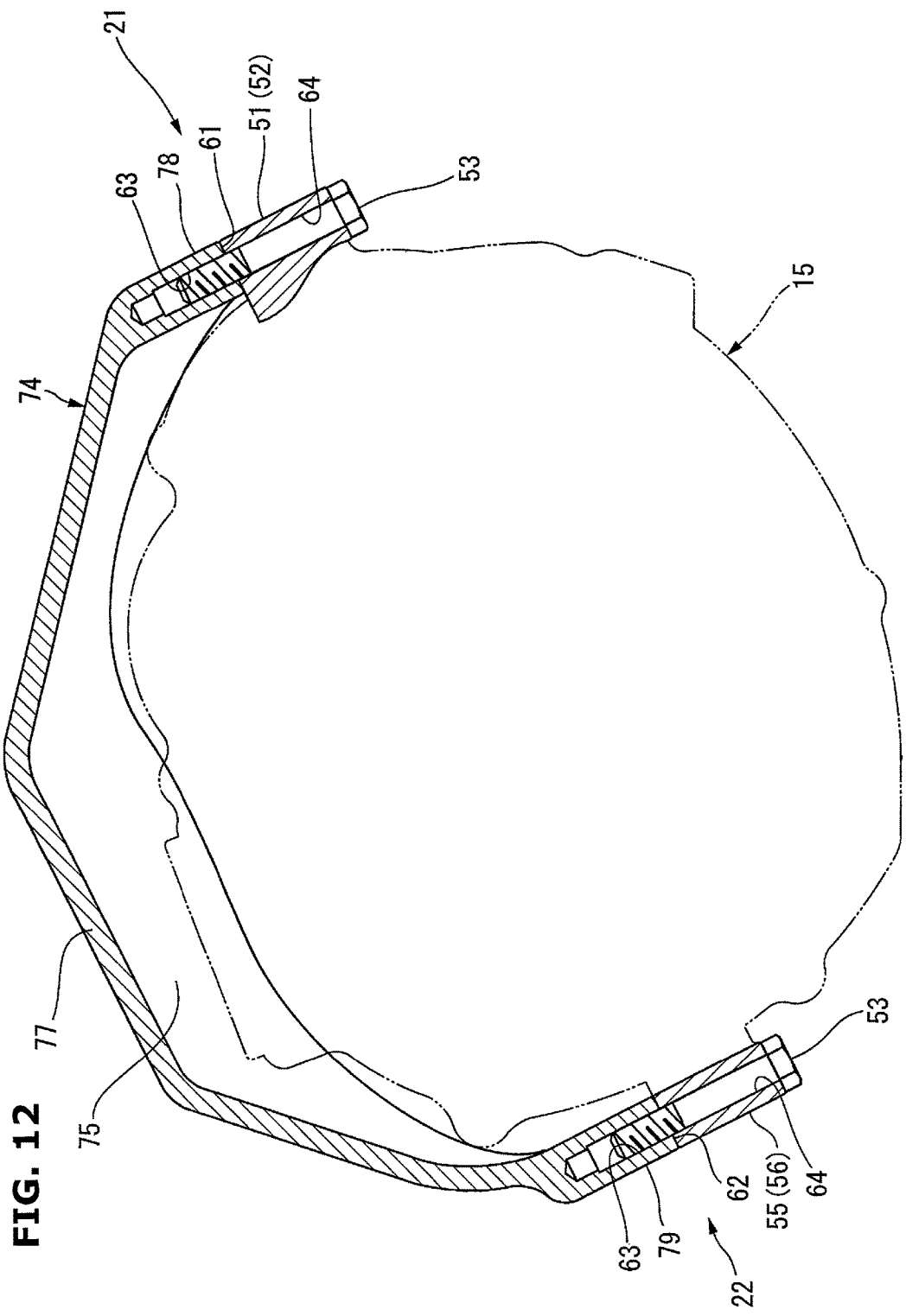
FIG. 12 is a side view of the bracket, and shows a state in which a front fastener and rear fastener are cut away.

As shown in FIG. 12, screw holes 63 are provided in the front mounting seat 61 and the rear mounting seat 62. Fixing bolts 53 inserted into through holes 64 of the first and second rear mounts 51 and 52 of the power unit 15 are screwed into the screw holes 63 of the front mounting seat 61. Fixing bolts 53 inserted into through holes 64 of the first and second rear mounts 55 and 56 are screwed into the screw holes 63 of the rear mounting seat 62.

Figure 11:
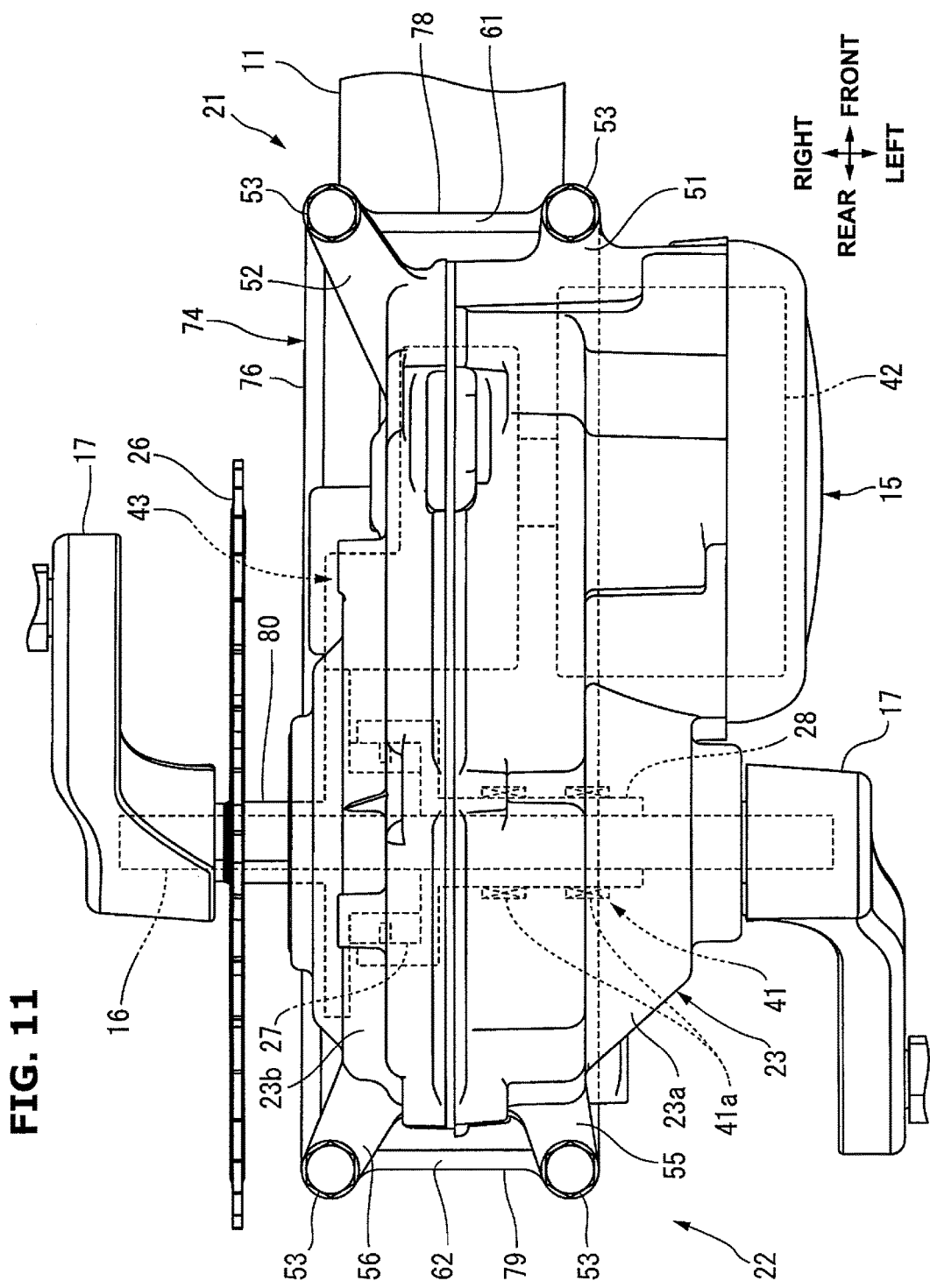
FIG. 11 is a bottom view of a power unit and a bracket.

As shown in FIG. 11, the power unit 15 according to the present preferred embodiment includes a cylindrical resultant force output shaft 80 into which a pedal crank shaft 16 is inserted. A chain sprocket 26 is fixed to the end of the resultant force output shaft 80 on the right side of the body frame. The end of the resultant force output shaft 80 on the left side of the body frame is connected to a crank rotation input shaft 28 via an input one-way clutch 27. A pedal force detector 41 according to the present preferred embodiment preferably includes a well-known magnetostrictive detector which detects, by a detecting coil 41a, a change in magnetic permeability when the crank rotation input shaft 28 strains due to the pedal force of the biker.

A speed reducer 43 according to the present preferred embodiment reduces the speed of the rotation of a motor 42, and transmits the rotation to the resultant force output shaft 80 via a motor one-way clutch (not shown). That is, the power unit 15 outputs the resultant force of human power applied to the pedal crank shaft 16 and the motor driving force to the outside via the resultant force output shaft 80. The resultant force of the human power and the motor driving force is transmitted from the resultant force output shaft 80 to the rear wheel 5 via the chain sprocket 26 and a chain 29. In the present preferred embodiment, the resultant force output shaft 80, chain sprocket 26, chain 29, and the like are an example of "a transmission."

In the present preferred embodiment, the same effects as that of the first preferred embodiment shown in FIGS. 1 to 8 are obtained.

Third Preferred Embodiment

Figure 13:
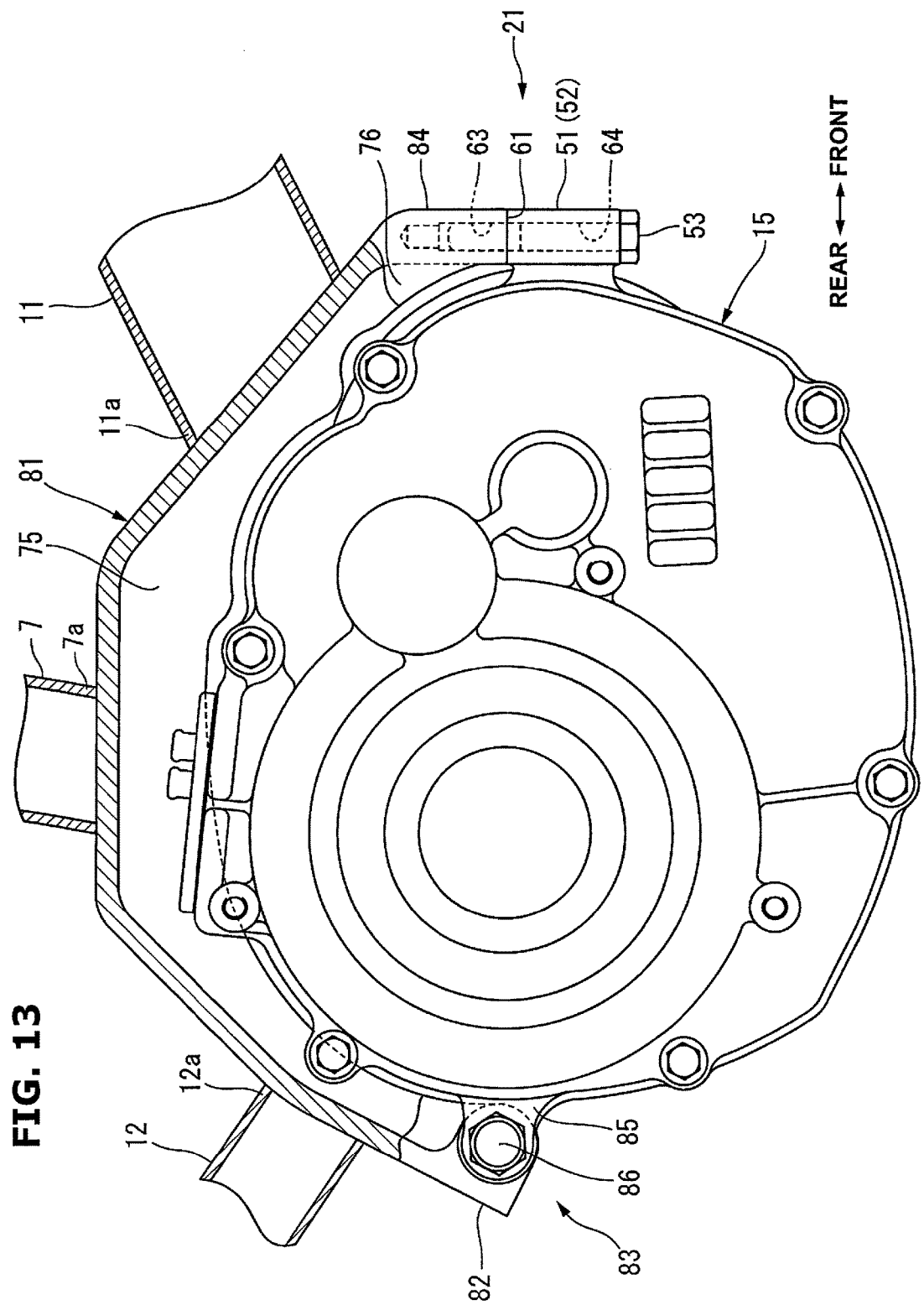
FIG. 13 is a side view of a power unit and a bracket according to a third preferred embodiment of the present invention.
Figure 14:
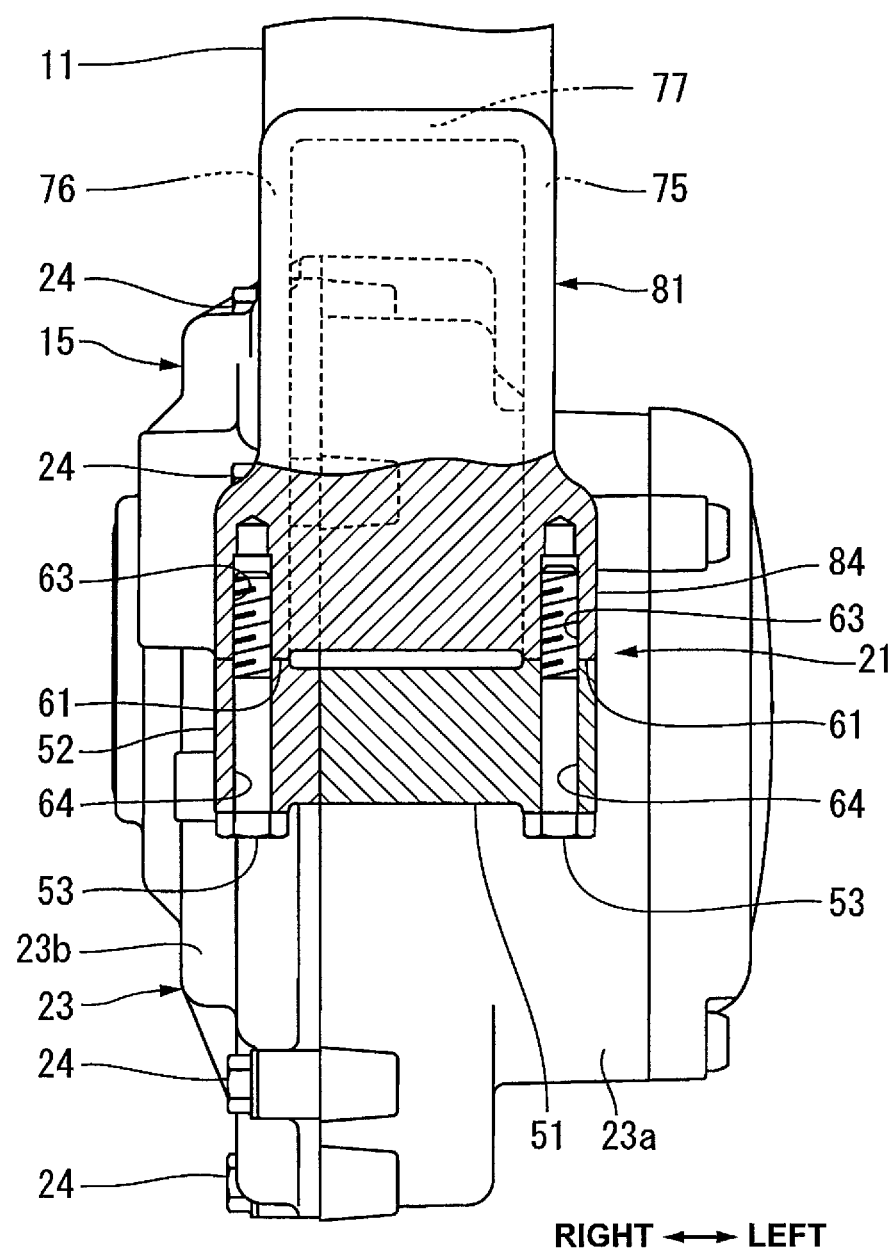
FIG. 14 is a front view of the power unit and the bracket when they are viewed from the front of the body frame.
Figure 15:
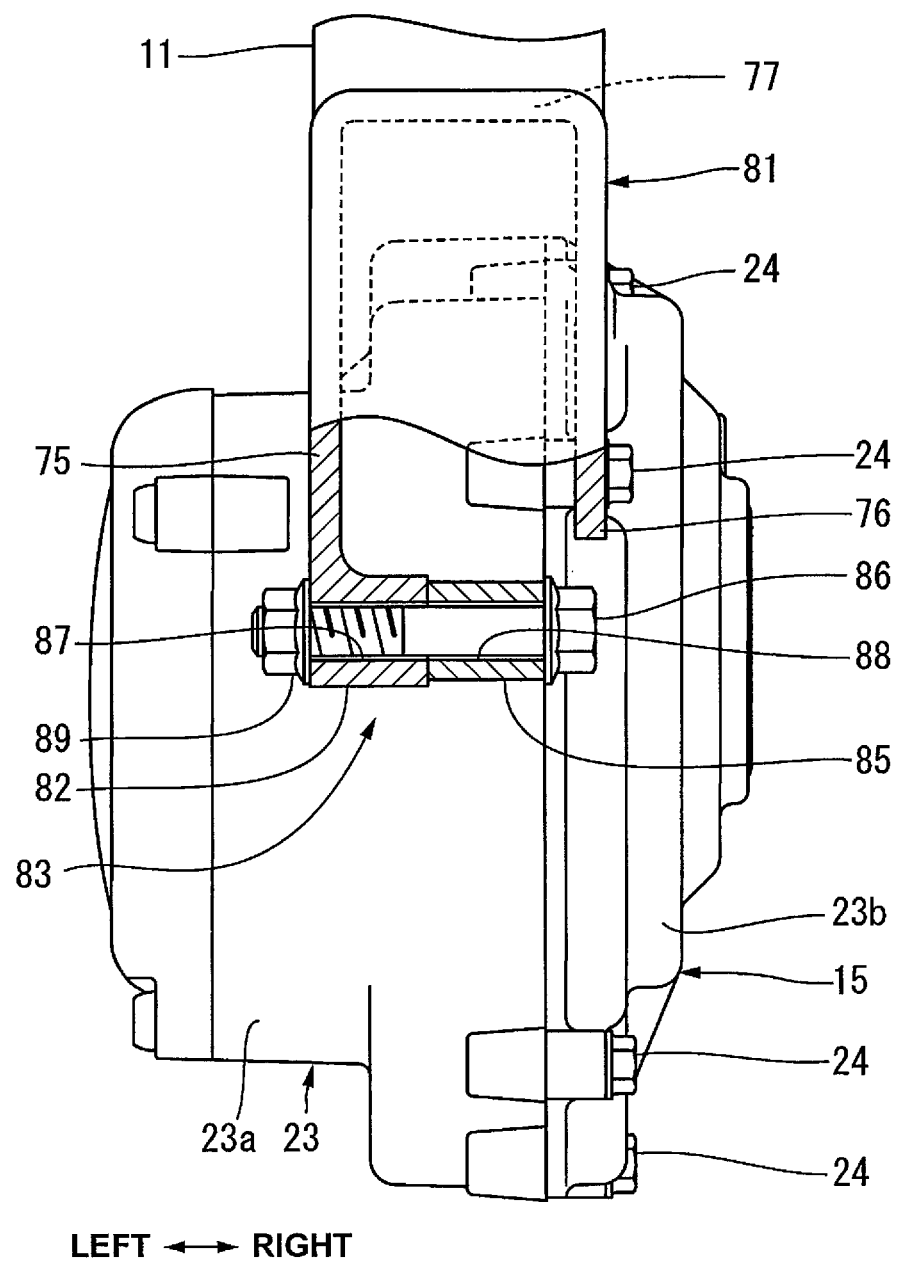
FIG. 15 is a rear view of the power unit and the bracket when they are viewed from the rear of the body frame.

A mounting structure for mounting a power unit on a body frame according to a third preferred embodiment of the present invention may be configured as shown in FIGS. 13 to 15. The same reference numerals as in FIGS. 1 to 12 denote the same or similar members in FIGS. 13 and 15, and a detailed explanation thereof will be omitted.

A power unit mounting bracket 81 according to the present preferred embodiment is preferably the same as the bracket 74 disclosed in the second preferred embodiment except that a first connector 82 (to be described below) is provided in the rear end.

The bracket 81 and a power unit 15 are connected to each other by a front fastener 21 including a front mounting seat 61 provided in the front end of the bracket 81, and a rear fastener 83 including the first connector 82 provided in the rear end of the bracket 81. As in the first and second preferred embodiments, the front fastener 21 includes the front mounting seat 61 of a bracket front end 84, first and second front mounts 51 and 52 of the power unit 15, and fixing bolts 53.

As shown in FIG. 15, the rear fastener 83 according to the present preferred embodiment includes the first connector 82 in the rear end of the bracket 81, a second connector 85 in the rear end of the power unit 15, and a fastening bolt 86 extending through the first and second connectors 82 and 85. The first connector 82 is preferably integral with a side plate 75 of the bracket 81 on the left side of the body frame. A through hole 87 extending in the left-right direction of the body frame is provided in the first connector 82.

The second connector 85 is preferably integral with a left half 23a of a housing 23. The position of the second connector 85 overlaps the first connector 82 in the left-right direction of the body frame, and corresponds to a central portion of the bracket 81 in the left-right direction when viewed from the rear of the body frame. The second connector 85 according to the present preferred embodiment preferably overlaps the end surface of the first connector 82 on the body frame right side. Also, a through hole 88 communicating with the through hole 87 of the first connector 82 when the second connector 85 overlaps the first connector 82 is provided in the second connector 85.

The fastening bolt 86 is inserted from the body frame right side into the through holes 87 and 88 of the first and second connectors 82 and 85 in a state in which the first and second connectors 82 and 85 overlap each other in the left-right direction of the body frame. A nut 89 is screwed on the distal end of the fastening bolt 86, which is positioned on the body frame left side. The first connector 82 and the second connector 85 are thus fastened to each other by the fastening bolt 86 extending in the left-right direction of the body frame.

In the present preferred embodiment, the work of mounting the power unit 15 on a body frame 6 is performed by turning the body frame 6 upside down, as in the above-described first and second preferred embodiments. When the body frame 6 is turned upside down, the front mounting seat 61 of the bracket 81 points upward. To mount the power unit 15 on the bracket 81, the power unit 15 is first placed on the bracket 81, and the first connector 82 and the second connector 85 are connected by the fastening bolt 86. In this state, the nut 89 is loosely screwed on the fastening bolt 86. This allows the power unit 15 to swing in an upper-lower direction around the fastening bolt 86 as an axis.

Figure 16:
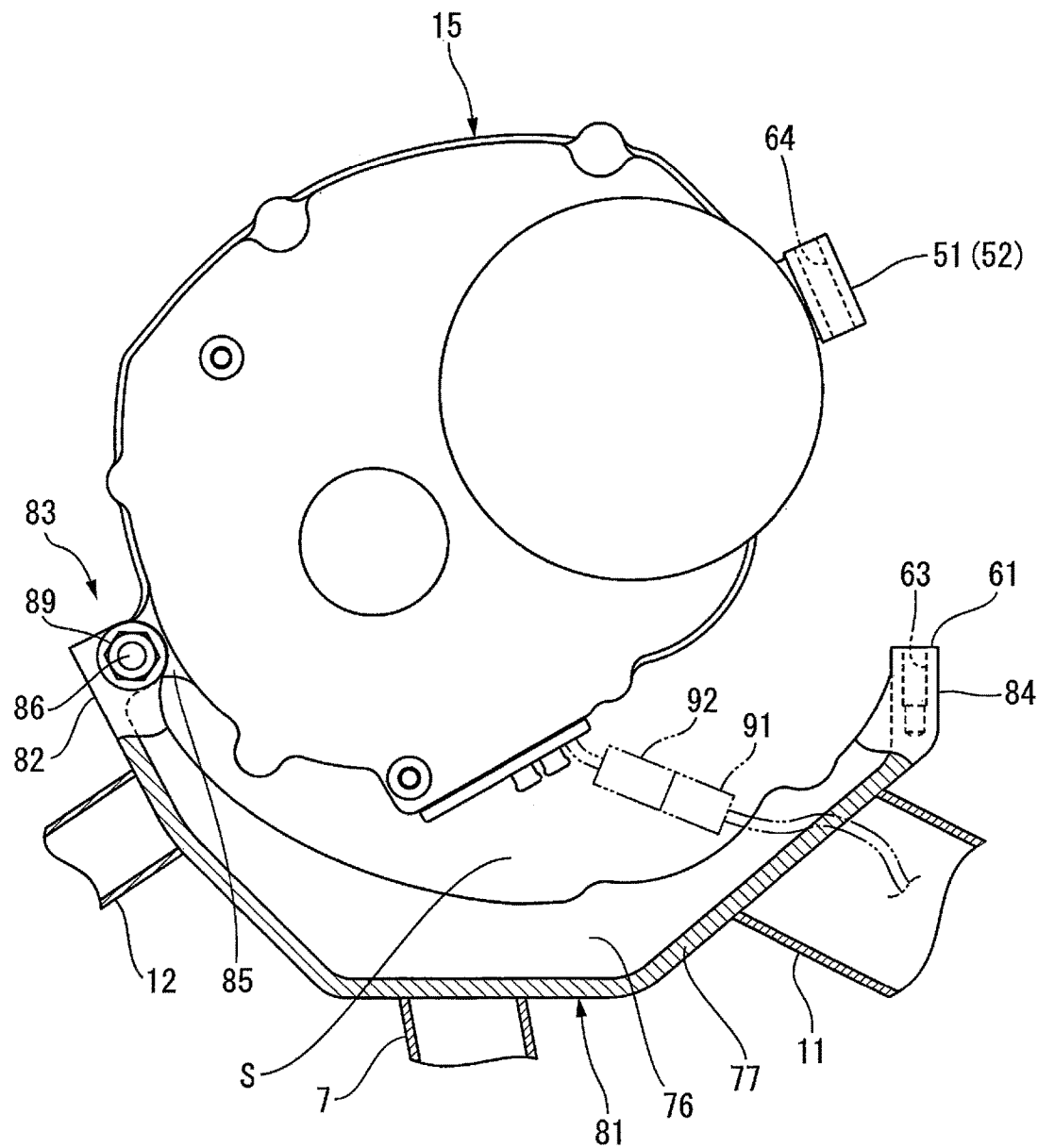
FIG. 16 is a side view for explaining the work of mounting a power unit.

Then, as shown in FIG. 16, a worker (not shown) pulls up the front end of the power unit 15, thus rotating the power unit 15 around the fastening bolt 86 as an axis. When the front end of the power unit 15 is pulled up, a space S is provided between the lower portion of the power unit 15 in this state (this portion is the upper portion when viewed in a state in which a front wheel 10 and a rear wheel 5 are grounded) and the bracket 81. Subsequently, the power unit 15 is held in the pulled-up state by using a jig (not shown) or the like, and the worker connects a connector 91 of the body frame and a connector 92 of the power unit 15 in the above-described space S. After this work of connecting the connectors 91 and 92 is complete, the power unit 15 is moved down to overlay the first and second front mounts 51 and 52 on the front mounting seat 61 of the bracket 81 from above. After that, the first and second front mounts 51 and 52 are fastened to the front mounting seat 61 by the fixing bolts 53, and the second connector 85 is fastened to the first connector 82 by the fastening bolt 86. The power unit 15 is fixed to the bracket 81 by thus fastening the fixing bolts 53 and the fastening bolt 86.

In the present preferred embodiment, the power unit 15 is swingable around the fastening bolt 86 as an axis when assembled. Therefore, the connecting work is performed as described above by providing a wide open space between the lower portion of the power unit 15 (that is, the upper portion when the front wheel 10 and rear wheel 5 are grounded) and the bracket 81. Accordingly, the present preferred embodiment is able to provide a power-assisted bicycle which further facilitates the work of assembling the power unit 15.

Fourth Preferred Embodiment

Figure 17:
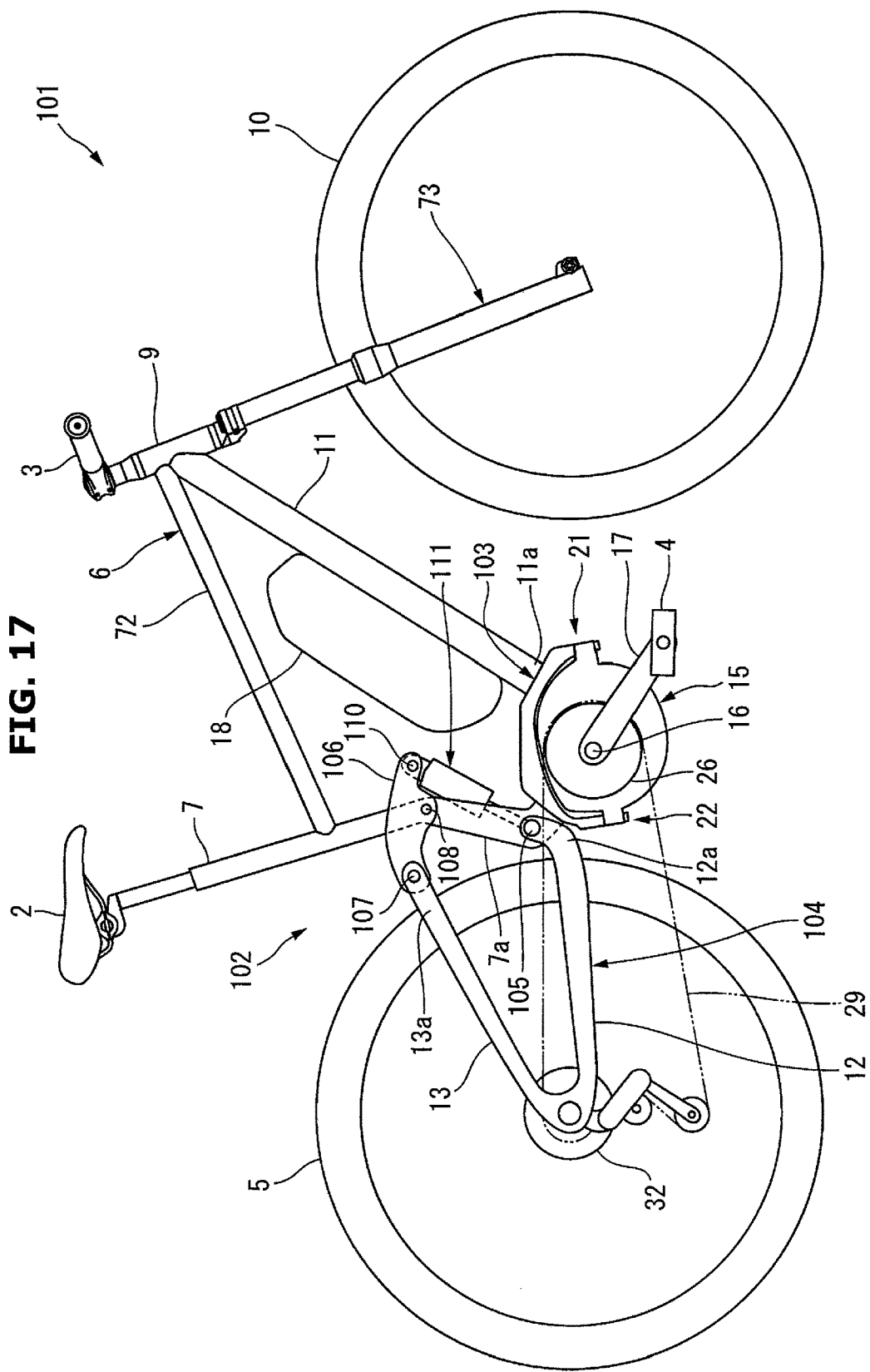
FIG. 17 is a side view of the body frame of a power-assisted bicycle according to a fourth preferred embodiment of the present invention.

A power-assisted bicycle according to a fourth preferred embodiment of the present invention is shown in FIG. 17. The same reference numerals as in FIGS. 1 to 16 denote the same or similar members in FIG. 17, and a detailed explanation thereof will be omitted.

As will be described in detail below, a power-assisted bicycle 101 shown in FIG. 17 includes a rear wheel suspension 102. A power unit mounting bracket 103 according to the present preferred embodiment includes the bracket 74 disclosed in the second preferred embodiment. The bracket 103 is, for example, welded to a lower end 11a of a down tube 11 and a lower end 7a of a seat tube 7. In the present preferred embodiment including the rear wheel suspension 102, chain stays 12 function as swing arms 104. Front ends 12a of the chain stays 12 are not welded to the bracket 103.

The front ends 12a of the chain stays 12 shown in FIG. 17 are connected to the lower end 7a of the seat tube 7 by a first spindle 105 so as to be swingable in an upper-lower direction.

Seat stays 13 shown in FIG. 17 swing together with the chain stays 12, and front ends 13a of the seat stays 13 are pivotally connected to the rear end of a link 106 by a second spindle 107. The seat stays 13 function as the swing arms 104 together with the chain stays 12. The link 106 includes a pair of left and right link pieces sandwiching the seat tube 7 from the two sides. A central portion of the link 106 in the front-rear direction is pivotally connected to the upper portion of the lower end 7a of the seat tube 7 by a third spindle 108. The upper end of a cushion unit 111 is pivotally connected to the front end of the link 106 by a fourth spindle 110. The front surface of the lower end 7a of the seat tube 7 is recessed rearward to define a recessed shape. The lower end of the cushion unit 111 is inserted into an internal recessed space of this recessed shape. The lower end of the cushion unit 111 is pivotally connected to the first spindle 105. The axes of the first to fourth spindles 105, 107, 108, and 110 are parallel or substantially parallel to the left-right direction of the body frame.

The bracket 103 and a power unit 15 according to the present preferred embodiment are connected to each other by a front fastener 21 and a rear fastener 22. Like the above-described preferred embodiments, therefore, no fastener is provided above the power unit 15, so the bracket 103 is arranged above and close the power unit 15. This creates a wide-open space above the bracket 103.

Also, a rear wheel 5 of the power-assisted bicycle 101 according to the present preferred embodiment is supported by a body frame 6 so as to be movable in an upper-lower direction by the rear wheel suspension 102 including the link 106 and the cushion unit 111. The lower portion of the cushion unit 111 is arranged in the free space above the bracket 103.

In the present preferred embodiment, therefore, the degree of freedom of the position of the cushion unit 111 increases, so the rear wheel suspension 102 having a high performance is able to be installed.

Modifications of Fasteners of the First to Fourth Preferred Embodiments

Figure 18:
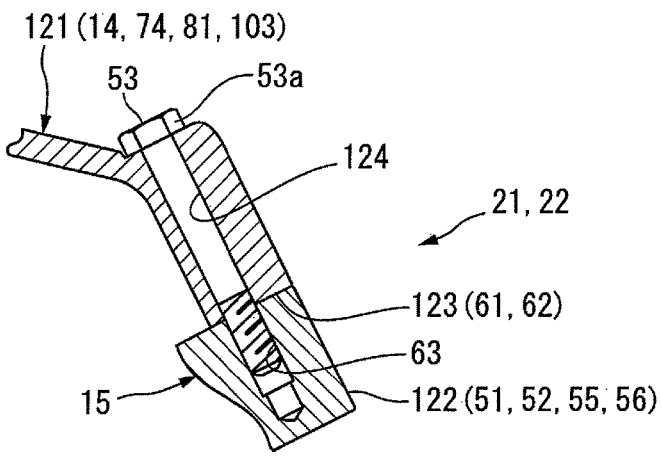
FIG. 18 is a sectional view showing another preferred embodiment of the fastener.
Figure 19:
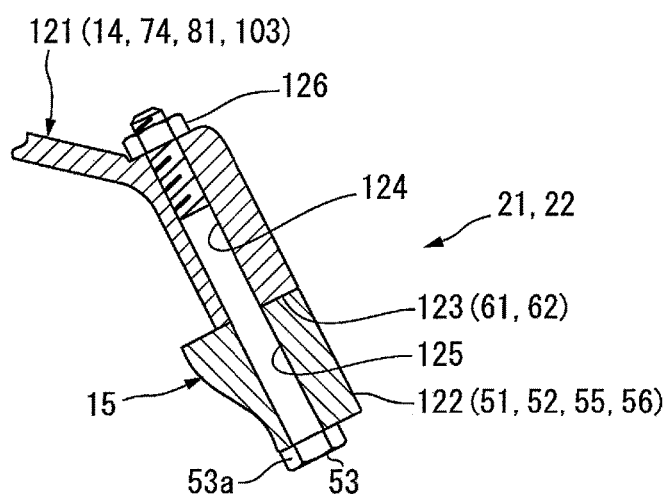
FIG. 19 is a sectional view showing still another preferred embodiment of the fastener.
Figure 20:
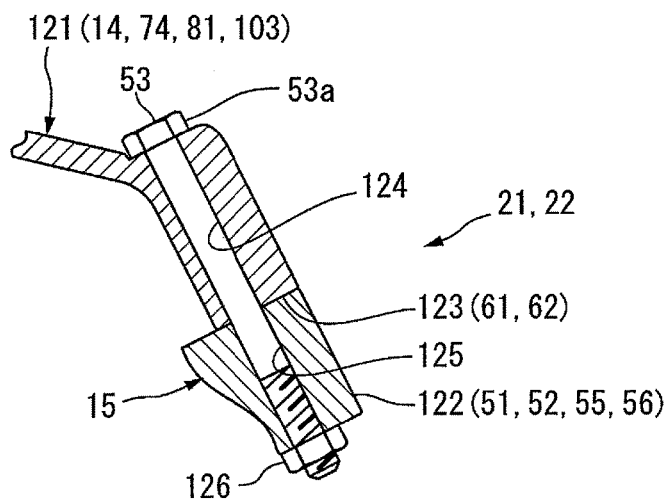
FIG. 20 is a sectional view showing still another preferred embodiment of the fastener.

In each of the above-described preferred embodiments, female screws into which the fixing bolts 53 are screwed preferably are provided as the screw holes 63 in the brackets 14, 74, 81, and 103. However, the structure of the female screw may appropriately be changed as shown in FIGS. 18 to 20. The same reference numerals as in FIGS. 1 to 17 denote the same or similar members in FIGS. 18 to 20, and a detailed explanation thereof will be omitted. In FIGS. 18 to 20, the brackets 14, 74, 81, and 103 will generally be referred to as a bracket 121.

Also, in FIGS. 18 to 20, the first and second front mounts 51 and 52 and the first and second rear mounts 55 and 56 will generally be referred to as a mount 122. Furthermore, in FIGS. 18 to 20, the front mounting seat 61 of the pillar member 49, the front mounting seat 61 of the bracket front ends 78 and 84, and the rear mounting seat 62 of the bracket rear ends 54 and 79 will generally be referred to as a mounting seat 123.

The screw hole 63 is provided in the mount 122 of the power unit 15 shown in FIG. 18. Also, a through hole 124 to insert the fixing bolt 53 is provided in the mounting seat 123 of the bracket 121 shown in each of FIGS. 18 to 20. The fixing bolt 53 shown in FIG. 18 is screwed into the screw hole 63 of the mount 122 through the through hole 124 of the bracket 121.

A through hole 125 to insert the fixing bolt 53 is provided in the mount 122 shown in each of FIGS. 19 and 20. The fixing bolt 53 shown in FIG. 19 is inserted into the through holes 124 and 125 from below. "Below," as used herein, means below when viewed in a state in which the front wheel 10 and rear wheel 5 are grounded. A nut 126 is screwed on the distal end (upper end) of the fixing bolt 53. The fixing bolt 53 shown in FIG. 20 is inserted into the through holes 124 and 125 from above. A nut 126 is screwed on the distal end (lower end) of the fixing bolt 53. The nut 126 shown in each of FIGS. 19 and 20 is provided as a member separate from the bracket 121 and the mount 122. The nut 126 shown in FIG. 19 may be, for example, welded to the bracket 121 beforehand. The nut 126 shown in FIG. 20 may be welded to the mount 122 beforehand.

In each of FIGS. 19 and 20, the nut 126, which is a member separate from one of the mounting seat 123 of the bracket 121 and the mount 122 of the power unit 15, is an example of "a female screw." In the present preferred embodiment, the mount 122 is able to be fastened to the mounting seat 123 by the fixing bolt 53 and the nut 126 without providing the screw hole 63 in the mount 122 or mounting seat 123. Accordingly, both the mounting seat 123 and the mount 122 have simple shapes, so the rigidity of these members is further increased.

In preferred embodiments of the present invention described above, the mount of the power unit is pushed against the mounting seat of the bracket by fastening the fixing bolt. Therefore, the bracket need not elastically deform when mounting the mount of the power unit on the mounting seat of the bracket, so a bracket having a high rigidity is provided. The bracket and the mount of the power unit need only be made with an accuracy by which they are able to overlap each other in an upper-lower direction. This accuracy is lower than that when inserting a mount between a pair of mounting plates so as to narrow the gap.

Accordingly, the power unit mounting bracket and the mount of the power unit need not be made with an accuracy higher than necessary, and the power unit is securely mounted on the body frame by using a high-rigidity power unit mounting bracket. Therefore, preferred embodiments of the present invention provide a power-assisted bicycle that improves both the fastening properties when mounting the power unit and the rigidity of the mounting structure, while also reducing the manufacturing cost.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power-assisted bicycle comprising:
   a front wheel;
   a rear wheel;
   a body frame that steerably and rotatably supports the front wheel and that rotatably supports the rear wheel;
   a bracket attached to the body frame;
   a power unit fixed to the bracket by a fixing bolt, the power unit including a crank shaft to be rotated by human power and a motor that produces auxiliary power, the power unit outputting each of the human power applied to the crank shaft and a driving force of the motor, or a combined force of the human power and the driving force of the motor; and
   a transmission that transmits the combined force of the human power and the driving force of the motor to the rear wheel; wherein
   the bracket includes a mounting seat pointing downward;
   the power unit includes a mount that overlaps the mounting seat from below; and
   the fixing bolt extends in a direction in which the mounting seat and the mount overlap each other, and fastens the mount to the mounting seat.

2. The power-assisted bicycle according to claim 1, wherein a female screw, into which the fixing bolt is screwed, is provided in one of the mounting seat and the mount, a through hole is provided in the other of the mounting seat and the mount and extends in an upper-lower direction, and the fixing bolt is screwed into the female screw through the through hole.

3. The power-assisted bicycle according to claim 1, further comprising a nut; wherein
   the fixing bolt is screwed into the nut; and
   the nut is a member separate from the bracket and the mount.

4. The power-assisted bicycle according to claim 1, wherein the body frame includes:
   a front fork that rotatably supports the front wheel;
   a head pipe that steerably supports the front fork;
   a down tube extending rearward and downward from the head pipe;
   a seat tube extending upward from a lower end of the down tube; and
   a chain stay extending forward from an axle of the rear wheel and that rotatably supports the rear wheel;
   the bracket is fixed to the body frame by at least the lower end of the down tube; and
   a fastener including the mounting seat, the mount, and the fixing bolt is provided in each of two ends of the bracket and the power unit in a front-rear direction.

5. The power-assisted bicycle according to claim 1, wherein the body frame includes:
   a front fork that rotatably supports the front wheel;
   a head pipe that steerably supports the front fork;
   a down tube extending rearward and downward from the head pipe;
   a seat tube extending upward from a lower end of the down tube; and
   a chain stay extending forward from an axle of the rear wheel and that rotatably supports the rear wheel;
   the bracket is fixed to the body frame by at least the lower end of the down tube;
   a fastener including the mounting seat, the mount, and the fixing bolt is provided in a first end of the bracket and the power unit in a front-rear direction;
   a first connector is provided in a second end of the bracket in the front-rear direction;
   a second connector overlapping the first connector in a left-right direction is provided in a second end of the power unit in the front-rear direction; and
   the first connector and the second connector are fastened to each other by a fastening bolt extending in the left-right direction.

* * * * *